United States Patent [19]
Shima

[11] Patent Number: 5,930,694
[45] Date of Patent: Jul. 27, 1999

[54] INCREASED GAIN LOOP ANTENNA FOR A RADIO SELECTIVE CALLING RECEIVER

[75] Inventor: Makoto Shima, Shizuoka, Japan

[73] Assignee: NEC Corporation, Tokyo, Japan

[21] Appl. No.: 08/662,524

[22] Filed: Jun. 13, 1996

[30] Foreign Application Priority Data

Jun. 20, 1995 [JP] Japan ................................ 7-153162

[51] Int. Cl.⁶ ............................................. H04B 1/08
[52] U.S. Cl. ............................................. 455/269; 455/351
[58] Field of Search ......................... 455/90, 349, 351,
455/269, 575, 347, 300, 301; 343/702

[56] References Cited

U.S. PATENT DOCUMENTS

| | | | |
|---|---|---|---|
| 4,313,119 | 1/1982 | Garay et al. | ............................. 343/702 |
| 5,054,120 | 10/1991 | Ushiyama et al. | . |
| 5,268,699 | 12/1993 | Laute et al. | . |
| 5,408,699 | 4/1995 | Yamashita et al. | ................... 455/90 X |

FOREIGN PATENT DOCUMENTS

| | | |
|---|---|---|
| 0 578 561 | 1/1994 | European Pat. Off. . |
| 2 707 124 | 1/1995 | France . |
| 1-241927 | 9/1989 | Japan . |

*Primary Examiner*—Thanh Cong Le
*Attorney, Agent, or Firm*—Young & Thompson

[57] ABSTRACT

A radio selective calling receiver having front and rear panels consisting of two conductive plates arranged parallel to each other at a predetermined interval to constitute main elements of a housing and simultaneously constitute a loop antenna for receiving a radio selective call signal, a printed circuit board arranged inside the two panels at an interval, and receiver circuit parts, mounted on the printed circuit board, for receiving the radio selective call signal from the loop antenna and performing signal processing, includes a spacer arranged in a gap between each of the panels and the printed circuit board, where no receiver circuit part is present.

7 Claims, 2 Drawing Sheets

INCREASED GAIN LOOP ANTENNA FOR A RADIO SELECTIVE CALLING RECEIVER

In addition, the conductive plates of this radio selective calling receiver are thin in general. For this reason, an external pressure such as a flexure or pressure load applied to the housing warps, bends, or twists the conductive plates, resulting in deformation or damage to the housing.

SUMMARY OF THE INVENTION

The present invention has been made in consideration of the above situation, and has as its object to provide a card type radio selective calling receiver which uses, as a loop antenna, a panel joint formed of metal conductive plates constituting the main elements of a housing, and realizes an increase in strength and an increase in gain of the loop antenna.

In order to achieve the above object, according to the main aspect of the present invention, there is provided a radio selective calling receiver having front and rear panels consisting of two conductive plates arranged parallel to each other at a predetermined interval to constitute main elements of a housing and simultaneously constitute a loop antenna for receiving a radio selective call signal, a printed circuit board arranged inside the two panels at an interval, and receiver circuit means, mounted on the printed circuit board, for receiving the radio selective call signal from the loop antenna and performing signal processing, comprising a spacer arranged in a gap between each of the panels and the printed circuit board, where no receiver circuit means is present.

According to another aspect of the present invention, there is provided a receiver wherein the spacer of the above main aspect consists of a magnetic material.

According to still another aspect of the present invention, there is provided a receiver wherein the housing of the above main aspect has the panels arranged on two outer frames of a thin resin molded body having a rectangular frame along a direction of thickness.

As described above, according to each aspect of the present invention, a spacer formed of a magnetic material is arranged in a gap between each of the two conductive plates serving as a housing and a loop antenna and the printed circuit board on which the receiver circuit parts are mounted, where no receiver circuit part is present. With this arrangement, the gain of the loop antenna can be increased. Therefore, the reception sensitivity of the radio selective calling receiver according to the present invention can be increased.

In addition, the present invention has an effect of preventing the conductive plates and the printed circuit board from being deformed or damaged even when an external pressure is applied to the conductive plates as the main elements of the housing.

Furthermore, the present invention has an effect of suppressing variations in frequency characteristics and increasing the gain. Therefore, the labor for antenna design can be saved.

The above and many other advantages, features and additional objects of the present invention will become manifest to those versed in the art upon making reference to the following detailed description and accompanying drawings in which preferred structural embodiments incorporating the principles of the present invention are shown by way of illustrative example.

DETAILED DESCRIPTION OF THE PREFERRED EMBODIMENT

A preferred embodiment of the present invention will be described below with reference to the accompanying drawings.

Figure 1:
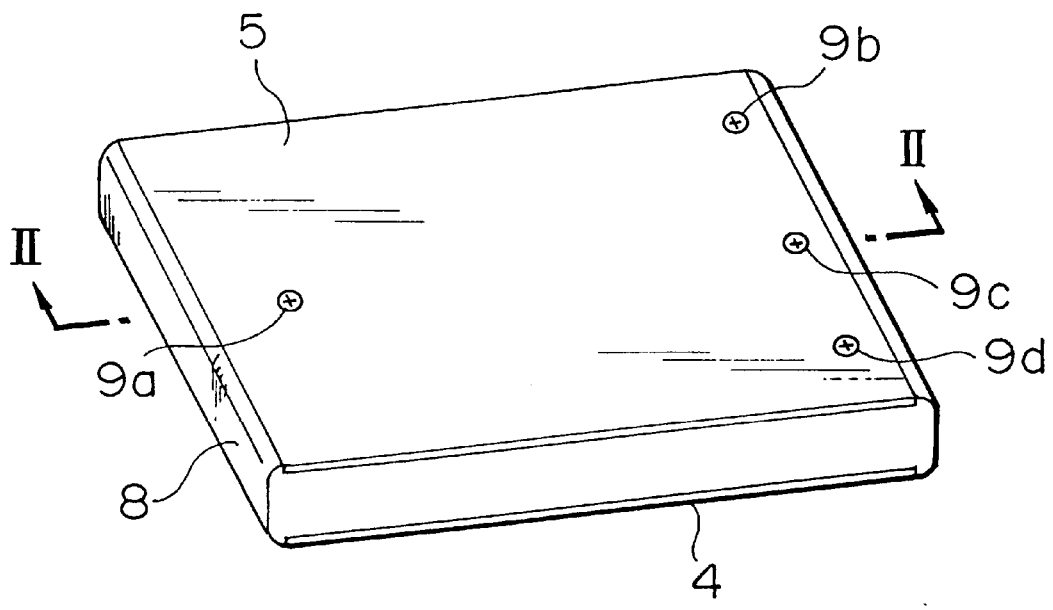
FIG. 1 is a perspective view schematically showing an embodiment of the present invention.

A radio selective calling receiver of the present invention has, as a housing frame, a thin resin molded body 8 having a rectangular frame and consisting of an insulating material. A front panel 4 and a rear panel 5 which are formed of metal conductive plates are arranged on the outer frame portions of the resin molded body 8 along the direction of thickness, thereby forming the housing (FIG. 1). The front panel 4 and the rear panel 5 are arranged parallel to each other at an interval. The front panel 4 and the rear panel 5 constitute not only the main elements of the housing but also the main elements of a loop antenna for receiving a radio selective call signal.

A printed circuit board 1 is arranged inside the front panel 4 and the rear panel 5 to be parallel to the front panel 4 and the rear panel 5 at an interval. The printed circuit board 1 fixes the positional relationship between the front panel 4, the rear panel 5, and the resin molded body 8 with a metal printed circuit board (to be referred to as a PWB hereinafter) joint 7b fixed to the front panel 4, another PWB joint (not shown) formed of an insulating material, the resin molded body 8, and the like. The printed circuit board 1 and the PWB joint 7b are fixed with a screw 9e.

Circuit parts 2 for receiving a radio selective call signal from the loop antenna and performing signal processing are mounted on both the surfaces of the printed circuit board 1. Upon receiving a radio selective call signal including a selective call number matching the call number of its own, the radio selective calling receiver of this embodiment performs signal processing by the circuit parts 2 and then calling notification by, e.g., ringing from a loudspeaker (not shown) arranged on the front panel 4.

One end of the front panel 4 is connected to one end of the rear panel 5 with a conductive panel joint 6 formed of, e.g., a metal member fixed to the front panel 4. In this embodiment, conductor connection between the panels 4 and 5 is achieved not only by connection with the panel joint 6 using a screw 9c but also by similar connection using screws 9b and 9d. A portion of the front panel 4 near the other end is connected with a screw 9a to a PWB joint 7a connected to the printed circuit board 1 by conductor connection. The PWB joint 7a, the rear panel 5, the panel joint 6, the front panel 4, and the PWB joint 7b form a loop antenna surrounding the printed circuit board 1 and the circuit parts 2. The feeder point of this loop antenna is formed between the connecting point between the PWB joint 7a and the printed circuit board 1 and the PWB joint 7b (a ground potential point formed on the printed circuit board 1). The radio selective call signal received by the loop antenna is supplied from this feeder point to the signal input terminal of the circuit parts 2.

Figure 2:
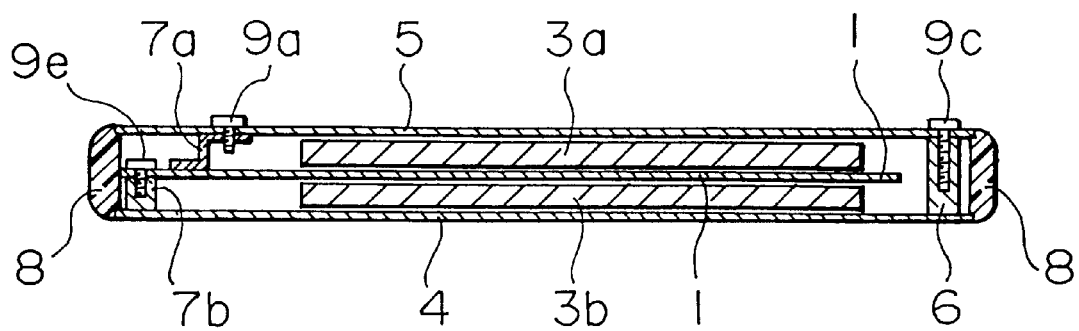
FIG. 2 is a sectional view taken along a line II—II of FIG. 1.
Figure 3:
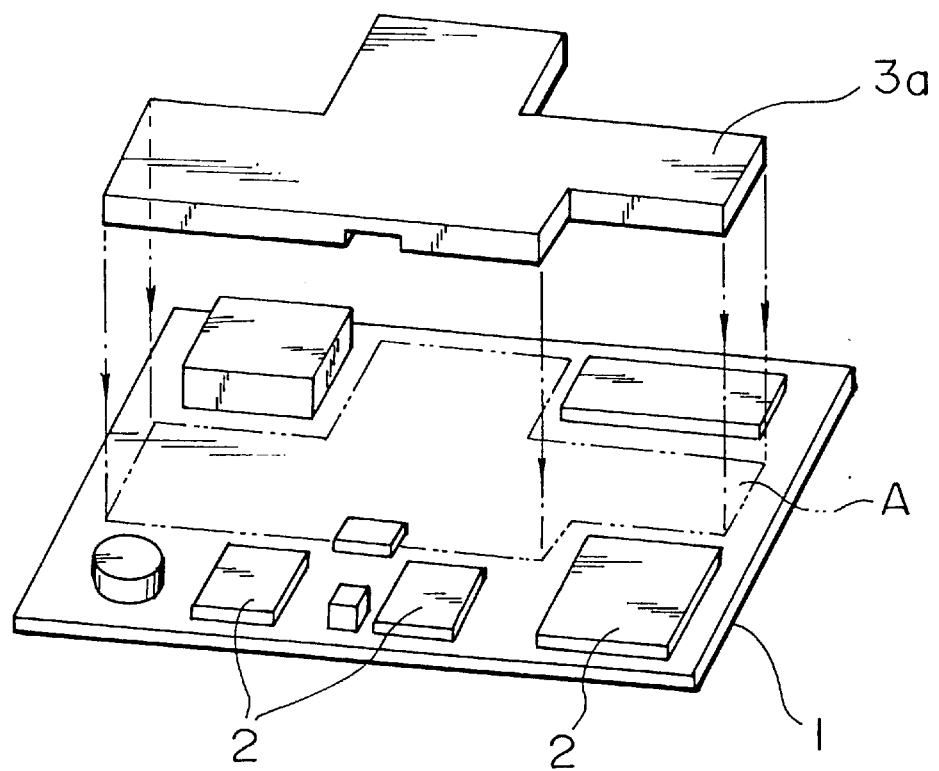
FIG. 3 is an exploded perspective view for explaining a spacer mounted state on a printed circuit board in the embodiment shown in FIGS. 1 and 2.

This radio selective calling receiver has spacers 3a and 3b in gaps between the front panel 4 and the printed circuit board 1 and between the rear panel 5 and the printed circuit board 1, respectively. The spacers 3a and 3b are formed of a magnetic material having a high permeability, such as ferrite, permalloy, or an amorphous magnetic material. The spacers 3a and 3b are formed in a shape conforming to the outer shapes of the circuit parts 2 on the printed circuit board 1, and inserted to a portion A on the printed circuit board 1 such that the gap between the circuit parts 2 and the front panel 4 or the rear panel 5 is filled (FIGS. 2 and 3). The thickness of the spacer 3a is set to almost eliminate the gap between the rear panel 5, the printed circuit board 1, and the circuit parts 2. The printed circuit board 1, the front panel 4, and the spacer 3b have a similar relationship therebetween. In assembling this receiver, the spacers 3a and 3b are fixed in advance to the printed circuit board 1 by screwing or adhesive bonding.

Since the spacers 3a and 3b formed of a magnetic material are inserted to the inside of the loop antenna using the front panel 4 and the rear panel 5 as the main elements, the flux is controlled to increase the flux density in the effective opening of this loop antenna and at the same time decrease the flux density at a loss portion. Therefore, with the effect of the spacers 3a and 3b, the effective permeability in the opening of this loop antenna increases to result in an increase in gain of the loop antenna.

In addition, in this embodiment, the spacers 3a and 3b are inserted to eliminate the gap between the circuit parts 2 and the front panel 4 or the rear panel 5 to reinforce the housing. Therefore, even when an external pressure such as a flexure or pressure load is applied to the panels 4 and 5, the panels 4 and 5 and the incorporated printed circuit board 1 can be prevented from deforming, i.e., warping, bending, or twisting, and can also be prevented from being damaged.

The loop length of the loop antenna, which is almost determined by the total length of the front panel 4 and the rear panel 5, is very small with respect to the wavelength of a use frequency. In addition, the gain of the loop antenna is high. Therefore, variations in frequency characteristics are suppressed, and no new antenna need be designed for each receiver type.

What we claim is:

1. A radio selective calling receiver having front and rear panels consisting of two conductive plates arranged parallel to each other at a predetermined interval to constitute main elements of a housing and simultaneously constitute a loop antenna for receiving a radio selective call signal, a printed circuit board arranged inside said two panels at an interval, and a receiver circuit means, mounted on said printed circuit board, for receiving the radio selective call signal from said loop antenna and performing signal processing, comprising two spacers, each consisting of a magnetic material and arranged in a respective gap between one of said panels and said printed circuit board, where no receiver circuit means is present.

2. A receiver according to claim 1, wherein said housing has said panels arranged on two outer frames of a thin resin molded body having a rectangular frame along a direction of thickness.

3. A receiver of claim 1, wherein said spacers each fills said respective gap.

4. The receiver of claim 1, wherein said front and rear panels are deformably flexible.

5. A radio selective calling receiver comprising:
   front and rear electrically conductive plates that are parallel and spaced from each other, said plates being a housing for the receiver and electrically connected to be a loop antenna for the receiver;
   a printed circuit board between and spaced from said plates; and
   front and rear spacers of magnetic material, each filling a space between said printed circuit board and a respective one of said front and rear plates so as to increase a gain of the loop antenna.

6. A receiver of claim 5, wherein said printed circuit board comprises plural projecting components, and said front and rear spacers are constructed and arranged to avoid said components.

7. The receiver of claim 5, wherein said front and rear plates are deformably flexible.

* * * * *